US012605718B2

(12) United States Patent
Hokari et al.

(10) Patent No.: US 12,605,718 B2
(45) Date of Patent: Apr. 21, 2026

(54) FILTRATION SEPARATOR FOR MAGNETIC PARTICLES AND FILTRATION SEPARATION METHOD FOR MAGNETIC PARTICLES

(71) Applicant: SEIKO EPSON CORPORATION, Tokyo (JP)

(72) Inventors: Hirofumi Hokari, Chino (JP); Michio Nakamori, Matsumoto (JP); Yasunari Ikeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 541 days.

(21) Appl. No.: 17/814,989

(22) Filed: Jul. 26, 2022

(65) Prior Publication Data

US 2023/0025505 A1 Jan. 26, 2023

(30) Foreign Application Priority Data

Jul. 26, 2021 (JP) ................................ 2021-121305

(51) Int. Cl.
*B03C 1/28* (2006.01)
*B03C 1/30* (2006.01)

(52) U.S. Cl.
CPC ................ *B03C 1/288* (2013.01); *B03C 1/30* (2013.01); *B03C 2201/18* (2013.01)

(58) Field of Classification Search
None
See application file for complete search history.

(56) References Cited

U.S. PATENT DOCUMENTS 4,054,513 A * 10/1977 Windle .................. B03C 1/027 505/933
5,147,554 A * 9/1992 Heck ....................... B03C 1/288 210/791
(Continued)

FOREIGN PATENT DOCUMENTS

JP S46025476 U 9/1971
JP H11153090 A 6/1999
(Continued)

OTHER PUBLICATIONS

Office Action for JP Patent Application No. 2021121305, issued on Feb. 4, 2025, 10 pages.
(Continued)

*Primary Examiner* — Peter Keyworth
(74) *Attorney, Agent, or Firm* — CHIP LAW GROUP

(57) ABSTRACT

A filtration separator for magnetic particles includes a storage tank that stores a liquid in which magnetic particles are dispersed, and that has a bottom portion and a side wall portion, a stirring mechanism having a rotating shaft portion inserted into the storage tank in a direction crossing a face of the bottom portion, and a stirring impeller that is coupled to the rotating shaft portion and that stirs the liquid by rotation of the rotating shaft portion, a magnet mechanism that is provided in at least a part of the side wall portion, and that can switch a magnetic force in the storage tank between an on state and an off state, and that adsorb the magnetic particles in the liquid to the side wall portion when it is in the on state, and a filtration mechanism having a filter provided in the bottom portion of the storage tank, and a discharge port from which the liquid after passing through the filter is discharged.

7 Claims, 9 Drawing Sheets

(56) References Cited

U.S. PATENT DOCUMENTS

| | | | |
|---|---|---|---|
| 2006/0105170 A1 | 5/2006 | Dobson et al. | |
| 2011/0244594 A1 | 10/2011 | Horii | |
| 2011/0293940 A1 | 12/2011 | Tokoro et al. | |
| 2015/0001437 A1 | 1/2015 | Carpenter et al. | |
| 2016/0159653 A1 | 6/2016 | Carpenter et al. | |
| 2018/0142775 A1* | 5/2018 | Pekarsky | B03C 1/286 |
| 2020/0047255 A1 | 2/2020 | Nishimura et al. | |

FOREIGN PATENT DOCUMENTS

| | | | |
|---|---|---|---|
| JP | 2005537653 | A | 12/2005 |
| JP | 2010058084 | A | 3/2010 |
| JP | 2012179574 | A | 9/2012 |
| JP | 2013151713 | A | 8/2013 |
| JP | 2015513780 | A | 5/2015 |
| WO | 2009119757 | A1 | 10/2009 |
| WO | 2018181046 | A1 | 10/2018 |
| WO | 2020193483 | A1 | 10/2020 |

OTHER PUBLICATIONS

Office Action for JP Patent Application No. 2021121305, issued on Aug. 5, 2025, 7 pages.

* cited by examiner

FIG. 9

| | | PRESENT EMBODIMENT | COMPARATIVE EXAMPLE 1 | COMPARATIVE EXAMPLE 2 |
|---|---|---|---|---|
| STEP | COATING REACTION | APPLICABLE | APPLICABLE | APPLICABLE |
| | COLLECTION BY MAGNETIC FORCE | WITH | WITHOUT | WITH |
| | FILTER FILTRATION | WITH | WITH | WITHOUT |
| | FILTRATION CAKE FORMATION TIME | GOOD (SHORT) | BAD (LONG) | NOT APPLICABLE |
| | CAKE WASHING | APPLICABLE | APPLICABLE | NOT APPLICABLE |
| RESULTS | SOLID-LIQUID SEPARATION TIME | GOOD (SHORT) | BAD (LONG) | GOOD (SHORT) |
| | WASHING EFFICIENCY | GOOD (HIGH) | GOOD (HIGH) | BAD (LOW) |
| | MAGNETIC PARTICLE LOSS | GOOD (SMALL) | GOOD (SMALL) | BAD (LARGE) |

FILTRATION SEPARATOR FOR MAGNETIC PARTICLES AND FILTRATION SEPARATION METHOD FOR MAGNETIC PARTICLES

The present application is based on, and claims priority from JP Application Serial Number 2021-121305, filed Jul. 26, 2021, the disclosure of which is hereby incorporated by reference herein in its entirety.

BACKGROUND

1. Technical Field

The present disclosure relates to a filtration separator for magnetic particles and a filtration separation method for magnetic particles.

2. Related Art

JP-A-2013-151713 (Patent Document 1) discloses a washing method for washing a metal powder by separating a foreign substance and a metal powder in a washing tank using a magnet, discharging the foreign substance from the washing tank, and thereafter supplying a washing liquid to the washing tank and dispersing the metal powder in the washing liquid.

However, in the method described in Patent Document 1, when the foreign substance and magnetic particles corresponding to the metal powder are separated, the magnetic particles which were not adsorbed to the magnet are sometimes discharged together with the foreign substance when performing washing. That is, it has been demanded that magnetic particles be efficiently separated in a short time.

SUMMARY

A filtration separator for magnetic particles includes a storage tank that stores a liquid in which magnetic particles are dispersed, and that has a bottom portion and a side wall portion, a stirring mechanism having a rotating shaft portion inserted into the storage tank in a direction crossing a face of the bottom portion, and a stirring impeller that is coupled to the rotating shaft portion and that stirs the liquid by rotation of the rotating shaft portion, a magnet mechanism that is provided in at least a part of the side wall portion, and that can switch a magnetic force in the storage tank between an on state and an off state, and that adsorb the magnetic particles in the liquid to the side wall portion when it is in the on state, and a filtration mechanism having a filter provided in the bottom portion of the storage tank, and a discharge port from which the liquid after passing through the filter is discharged.

A filtration separation method for magnetic particles includes storing a liquid in which magnetic particles are dispersed in a storage tank having a bottom portion and a side wall portion, bringing a magnetic force in the storage tank into an on state from at least a part of the side wall portion, adsorbing the magnetic particles to the side wall portion by rotating a rotating shaft portion inserted in a direction crossing a face of the bottom portion and stirring the liquid with a stirring impeller coupled to the rotating shaft portion in a state where the magnetic force is in the on state, filtering the liquid through a filter by discharging the liquid from a discharge port provided in the bottom portion in a state where the magnetic particles are adsorbed to the side wall portion, and placing the magnetic particles adsorbed to the side wall portion on the filter by bringing the magnetic force in the storage tank into an off state.

BRIEF DESCRIPTION OF THE DRAWINGS

FIG. 9 is a comparison table showing the results of the filtration separation method.

DESCRIPTION OF EXEMPLARY EMBODIMENTS

In the following respective drawings, three axes orthogonal to one another are referred to as X axis, Y axis, and Z axis, and a description will be given. A direction along the X axis is referred to as "X direction", a direction along the Y axis is referred to as "Y direction", and a direction along the Z axis is referred to as "Z direction", and a direction of an arrow is referred to as + direction, and a direction opposite to the + direction is referred to as − direction. The +Z direction is sometimes referred to as "upper" or "upper side", and the −Z direction is sometimes referred to as "lower" or "lower side", and viewing from the +Z direction is also referred to as plan view or planar. Further, a face at the + side in the Z direction is referred to as an upper face, and a face at the − side in the Z direction, which is at the opposite side thereto, is referred to as a lower face, and a description will be given.

First, a configuration of a filtration separator 100 for magnetic particles 11 will be described with reference to FIGS. 1 and 2.

Figure 1:
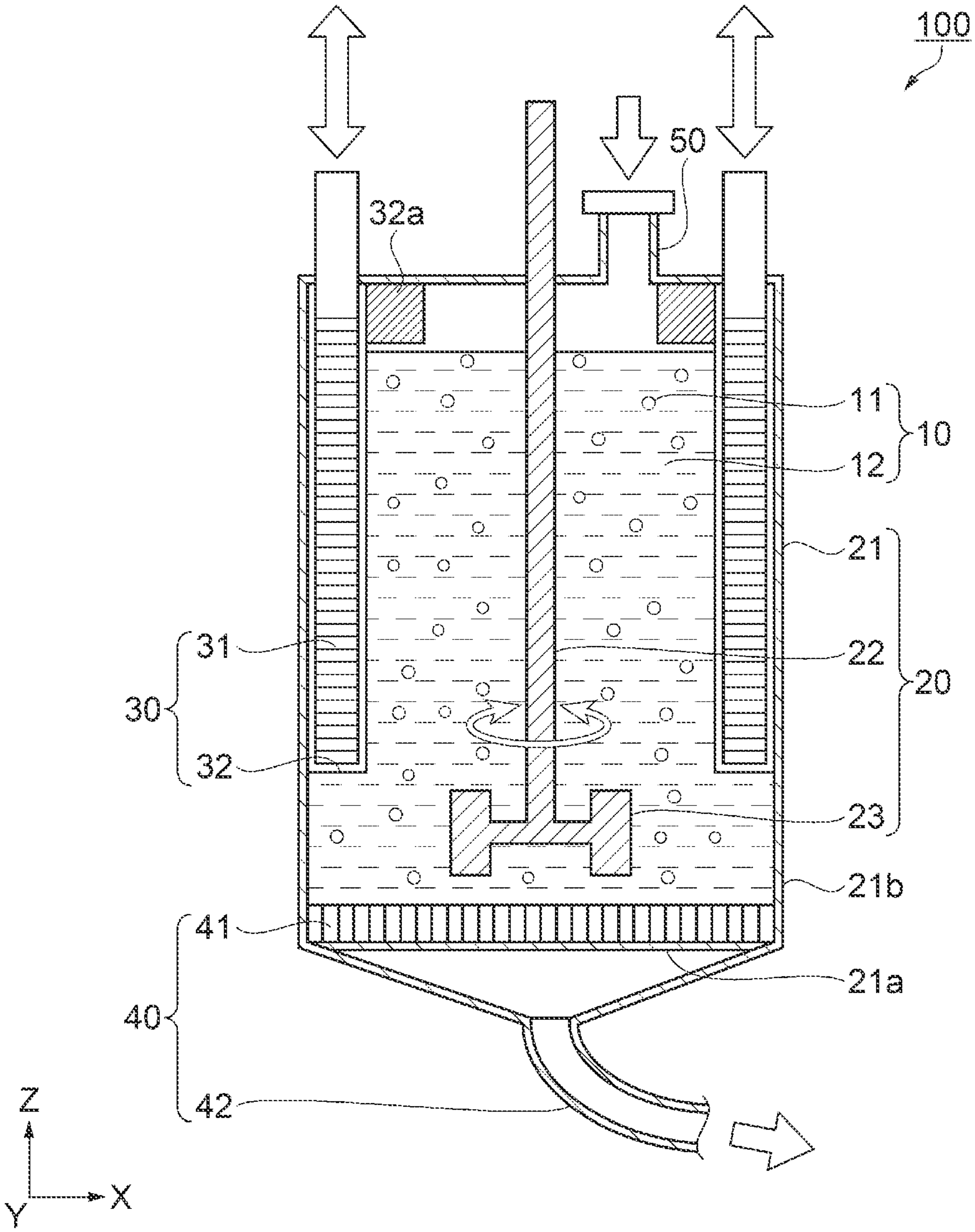
FIG. 1 is a cross-sectional view showing a configuration of a filtration separator.
Figure 2:
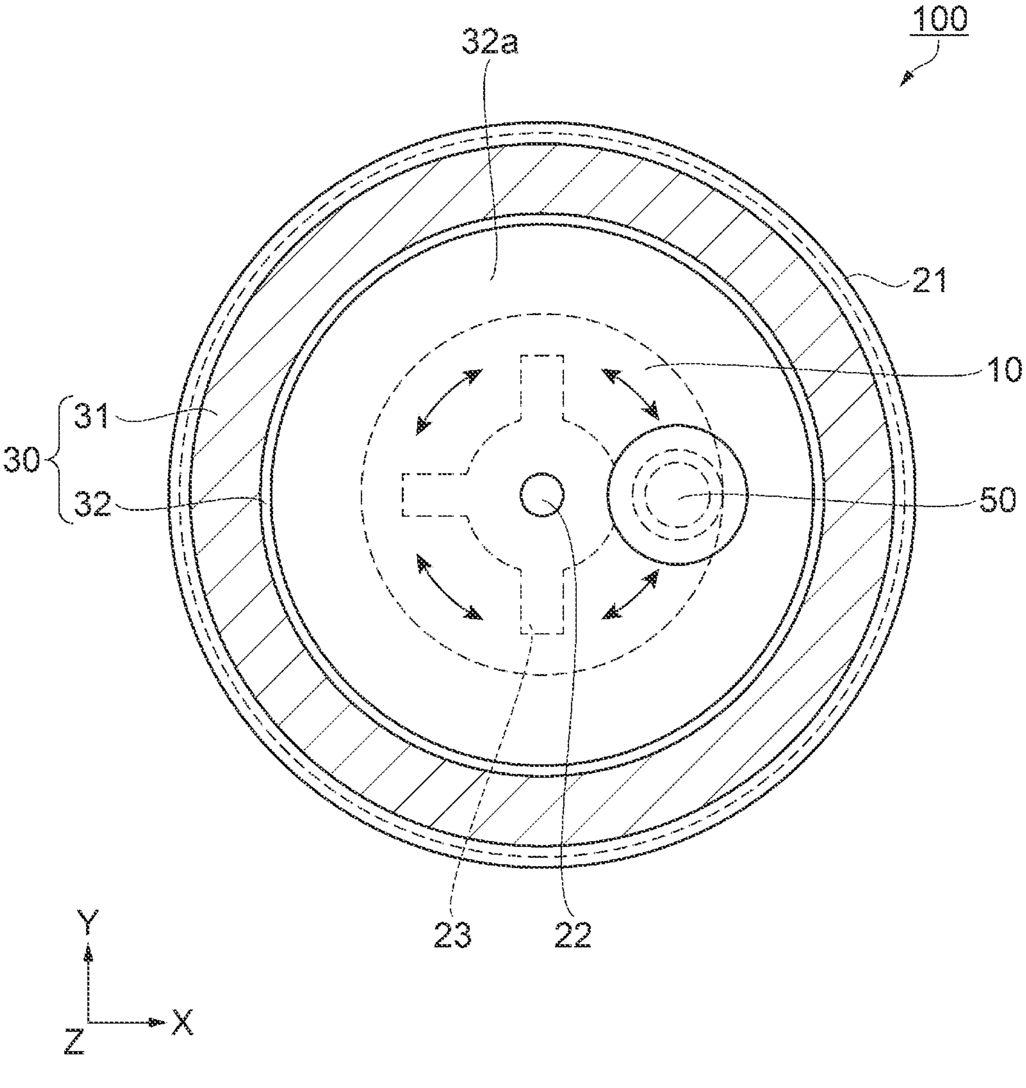
FIG. 2 is a plan view of the filtration separator seen from above.

As shown in FIGS. 1 and 2, the filtration separator 100 for the magnetic particles 11 includes a stirring mechanism 20, a magnet mechanism 30, and a filtration mechanism 40.

The stirring mechanism 20 has a storage tank 21, a rotating shaft portion 22, and a stirring impeller 23. The storage tank 21 has a bottom portion 21*a*, in which a filter 41 is placed, and a side wall portion 21*b* in a hollow columnar shape coupled to the bottom portion 21*a*. In the storage tank 21, a liquid 10 in which the magnetic particles 11 are dispersed is stored.

The magnetic particles 11 are, for example, particles to be used in a sol-gel method, and the surface of a core is coated with silicon oxide ($SiO_2$). The liquid 10 is a liquid that is used when forming the magnetic particles 11 by a sol-gel method and that contains the magnetic particles 11 and a reaction liquid 12. Specifically, the liquid 10 contains a so-called material that promotes hydrolysis including tetraethoxysilane.

The rotating shaft portion 22 is inserted in a direction crossing a face of the bottom portion 21*a* of the storage tank 21. The stirring impeller 23 has a function of stirring the liquid 10 in the storage tank 21, and is constituted by, for example, four blades as shown in FIG. 2. The stirring impeller 23 is coupled to the rotating shaft portion 22 and rotates with the rotation of the rotating shaft portion 22.

The magnet mechanism 30 has a magnet 31, and the magnet is provided so that it can be put in and out of a storage portion 32 in a pocket-like shape provided in the side wall portion 21*b* of the storage tank 21. The magnet 31 is formed in, for example, a hollow columnar shape as shown in FIGS. 1 and 2. Further, the magnet 31 is a permanent magnet in the present embodiment. The storage portion 32 is provided with a circular recessed portion inside the storage tank 21 so that the magnet 31 can be stored therein.

By disposing the magnet 31 in the storage portion 32, the position or the height of the magnet 31 in the storage tank 21 can be disposed at a predetermined place. The magnet mechanism 30 can switch the magnetic force in the storage tank 21 between an on state and an off state.

The on state is a state where the magnet 31 is stored in the storage portion 32 and the liquid 10 in the storage tank 21 is affected by a magnetic force. In addition, the on state is a state where the magnet 31 is brought close to the side wall portion 21*b* of the storage tank 21. When it is in the on state, the magnetic particles 11 in the storage tank 21 move toward the magnet 31.

The off state is a state where the magnet 31 is pulled out of the inside of the storage portion 32 and is a state where the liquid 10 in the storage tank 21 is not affected by a magnetic force. In addition, the off state is a state where the magnet 31 is separated from the side wall portion 21*b* of the storage tank 21. When it is in the off state, the magnetic particles 11 in the storage tank 21 are in a state of being dispersed in the liquid 10.

As described above, the switching between the on state and the off state can be carried out by moving the magnet 31 in a direction along the side wall portion 21*b* of the storage tank 21.

The filtration mechanism 40 has a filter 41 disposed in the bottom portion 21*a* of the storage tank 21, and a discharge port 42 from which a part of the liquid 10 after passing through the filter 41 is discharged. A material to be discharged from the discharge port 42 is the unnecessary reaction liquid 12 of the liquid 10 after performing a coating reaction of the magnetic particles 11 with silicon oxide. The filter 41 can capture the magnetic particles 11 which could not be adsorbed to the magnet 31 by filtering the liquid 10.

The storage portion 32 includes a separation wall 32*a* that separates the magnet 31 and the magnetic particles 11 adsorbed to the magnet mechanism 30. In other words, the separation wall 32*a* has a function of a stopper so as to prevent the magnetic particles 11 from going outside the storage tank 21 when the magnet 31 is pulled out of the storage portion 32. The separation wall 32*a* is provided adjacent to the storage portion 32 at the upper face of the storage tank 21, and is formed so as to protrude toward the center of the storage tank 21 from the storage portion 32.

In an upper part of the storage tank 21, a washing liquid supply portion 50 for supplying a washing liquid 51 into the storage tank 21 is provided. The washing liquid 51 is used for, for example, washing the magnetic particles 11 collected in the storage tank 21.

Next, a filtration separation method for the magnetic particles 11 will be described with reference to FIGS. 3 to 8.

Figure 3:
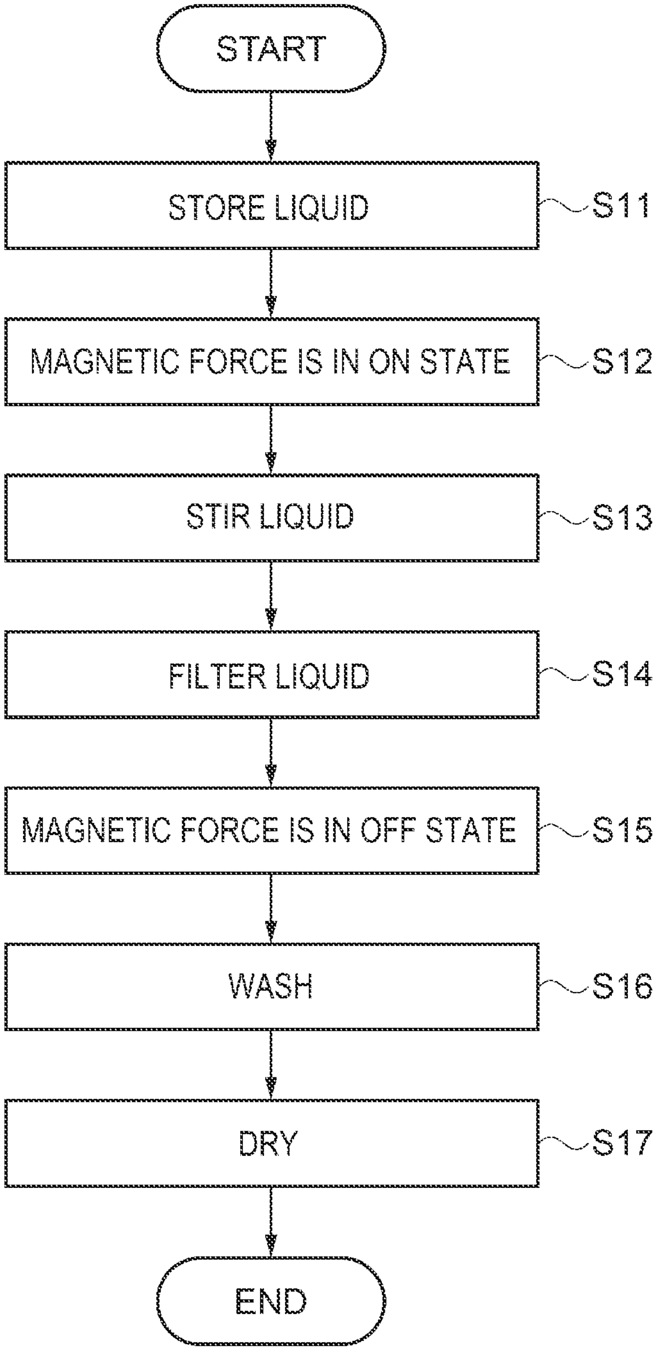
FIG. 3 is a flowchart showing a filtration separation method.
Figure 4:
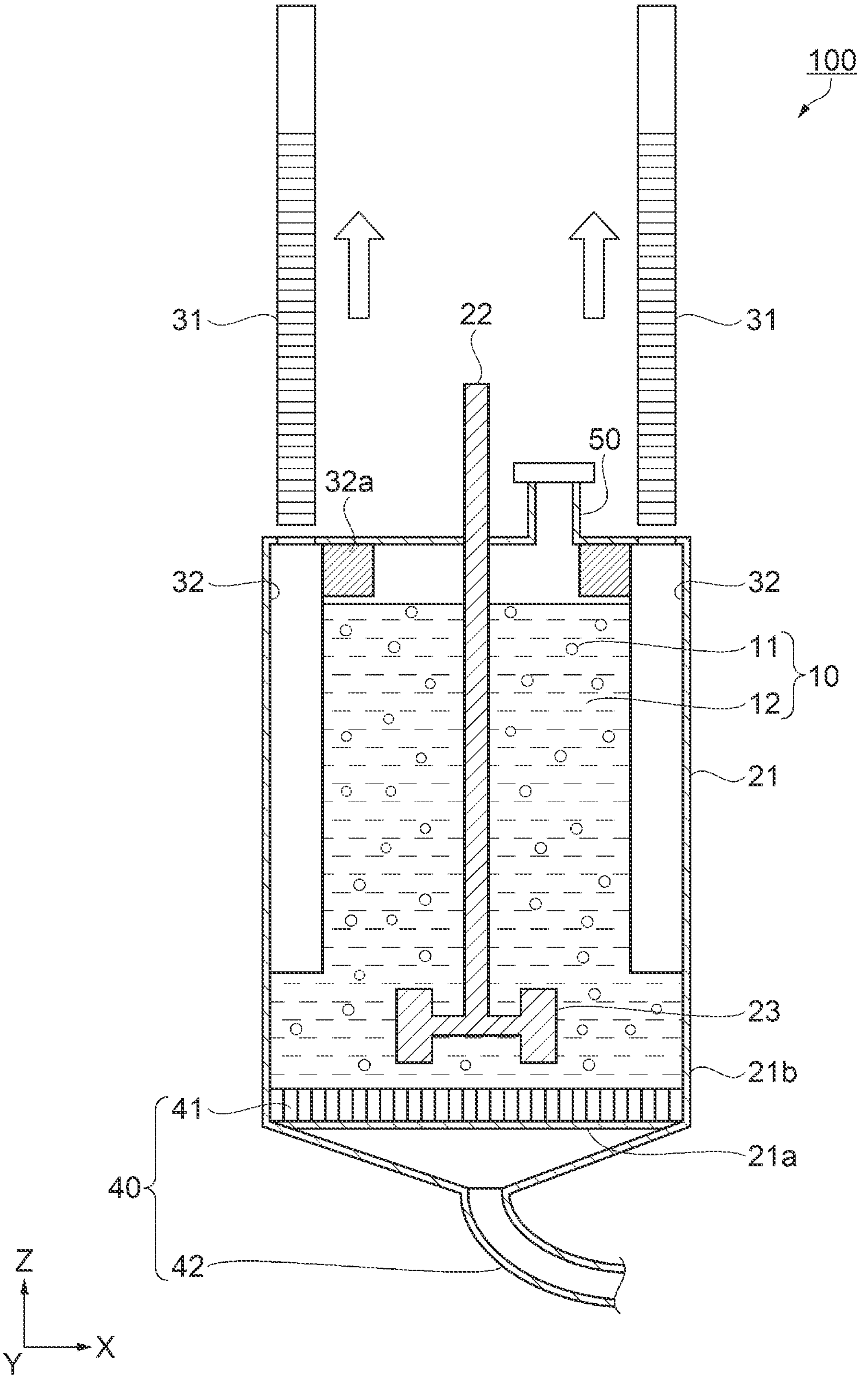
FIG. 4 is a cross-sectional view of the filtration separator illustrating the filtration separation method.

First, as shown in FIG. 3, in Step S11, the liquid 10 is stored in the storage tank 21. Specifically, as shown in FIG. 4, for example, the liquid 10 is stored in the storage tank 21 by detaching the upper part of the storage tank 21, or the like. The liquid 10 is a liquid containing the magnetic particles 11 to be used in a sol-gel method and the reaction liquid 12 as described above. The magnetic particles 11 are in a state of being dispersed throughout the storage tank 21. Further, the magnet 31 is in a state of being pulled out outside the storage portion 32.

The coating reaction is performed by stirring the liquid (also referred to as a reaction liquid slurry) in which the magnetic particles 11 and the reaction liquid 12 (for example, a coating material) are mixed with the stirring impeller 23 in this state. That is, by using the magnetic particle 11 as a core and silicon oxide as a shell, a particle in which the surface of the magnetic particle 11 is coated with silicon oxide is completed. In other words, the magnetic particle 11 coated with a gel-like substance is completed.

Figure 5:
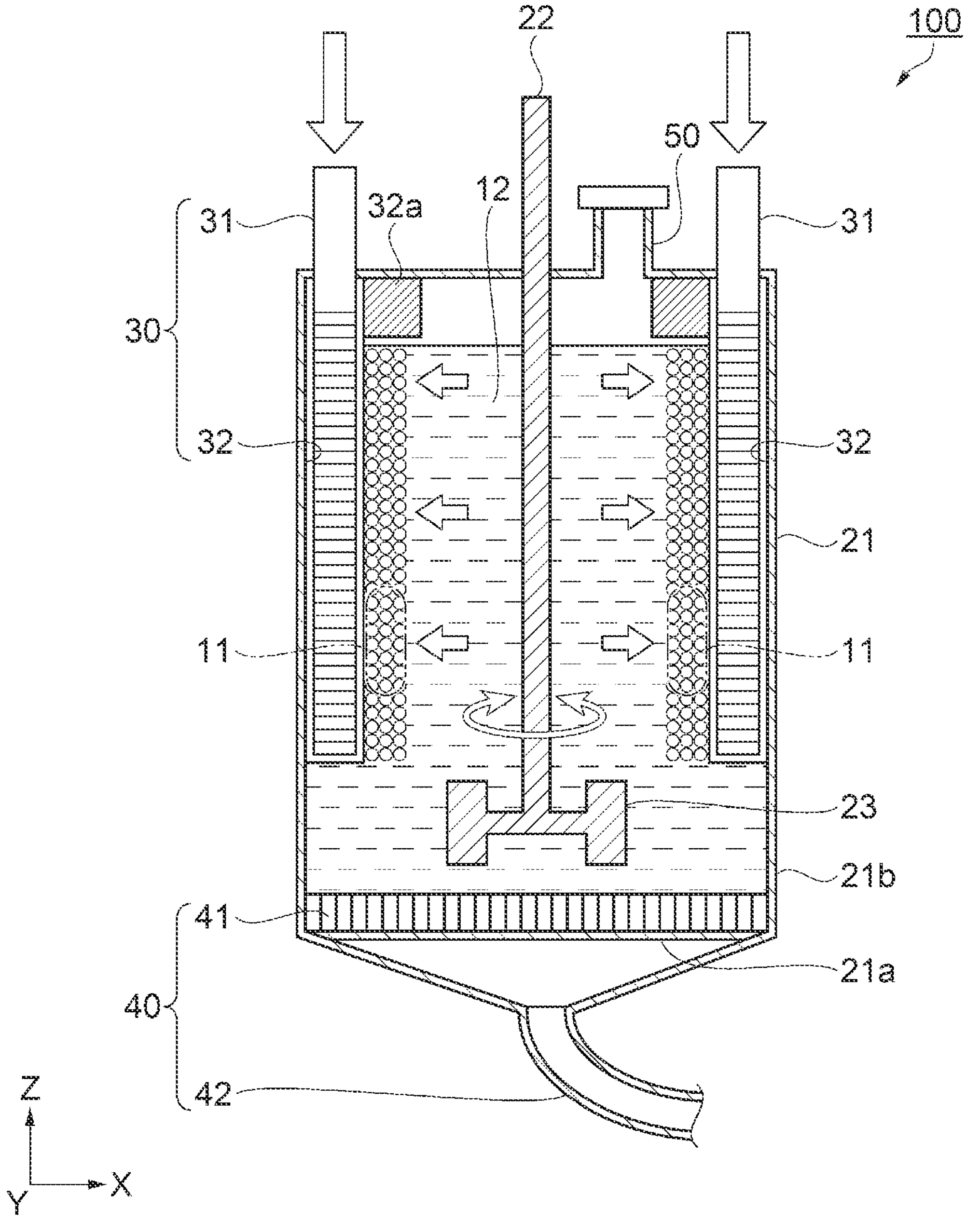
FIG. 5 is a cross-sectional view of the filtration separator illustrating the filtration separation method.

Subsequently, in Step S12, the magnetic force in the storage tank 21 is brought into an on state. Specifically, as shown in FIG. 5, the magnet 31 is moved and stored in the storage portion 32 of the storage tank 21. By doing this, a state where the magnetic force is applied to the liquid 10 in the storage tank 21 is created. That is, the magnetic force becomes in an on state. The magnetic force is, for example, 14,000 gauss (1.4 tesla).

Subsequently, the liquid 10 is stirred. Specifically, as shown in FIG. 5, the rotating shaft portion 22 is rotated so that the stirring impeller 23 coupled to the rotating shaft portion 22 is rotated. By doing this, the liquid 10 in the storage tank 21 is stirred, and the magnetic particles 11 in the liquid 10 are moved. Since the magnetic force in the storage tank 21 is in an on state, the moved magnetic particles 11 are adsorbed to the magnet 31 of the magnet mechanism 30 through the storage portion 32.

In this manner, by continuing to stir the liquid 10 for a predetermined time, as shown in FIG. 5, the magnetic particles 11 in the liquid 10 are adsorbed to the magnet 31. In the liquid 10, the magnetic particles 11 in a floating state without being adsorbed to the magnet 31 are present.

Figure 6:
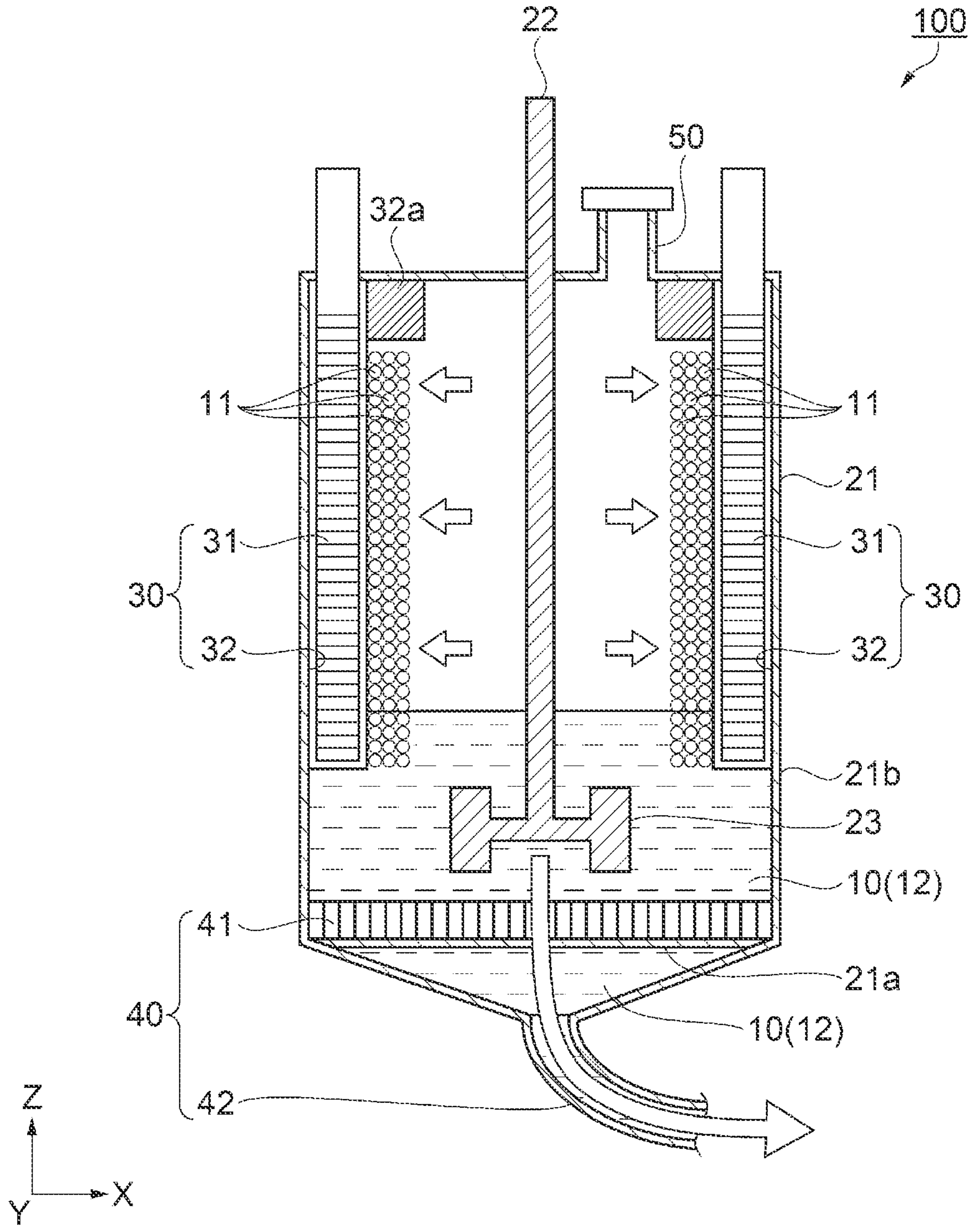
FIG. 6 is a cross-sectional view of the filtration separator illustrating the filtration separation method.

Subsequently, in Step S14, the liquid 10 is filtered. Specifically, as shown in FIG. 6, the liquid 10 in the storage tank 21 is discharged from the discharge port 42 of the filtration mechanism 40. The magnetic force of the magnet mechanism 30 stays in the on state. Therefore, the magnetic particles 11 are in a state of being adsorbed to the magnet 31 as shown in FIG. 6.

That is, the liquid 10 to be discharged from the discharge port 42 is the unnecessary reaction liquid 12 left over when performing the coating reaction in Step S11. The magnetic particles 11 which were not adsorbed to the magnet 31 are captured by the filter 41 disposed in the bottom portion 21*a* of the storage tank 21. By doing this, the magnetic particles 11 and the reaction liquid 12 are separated. When the liquid 10 is discharged, the magnetic particles 11 are not in a state of being collected (for example, in a cake state) on the filter 41, and therefore, the liquid 10 can be discharged quickly and rapidly.

The size of the magnetic particle 11 is, for example, 1.6 μm in diameter. For example, when the size of the magnetic particle 11 is 1.6 μm, the pore diameter of the filter 41 is 0.5 μm, which is about ⅓ or less of the size of the magnetic particle 11.

Figure 7:
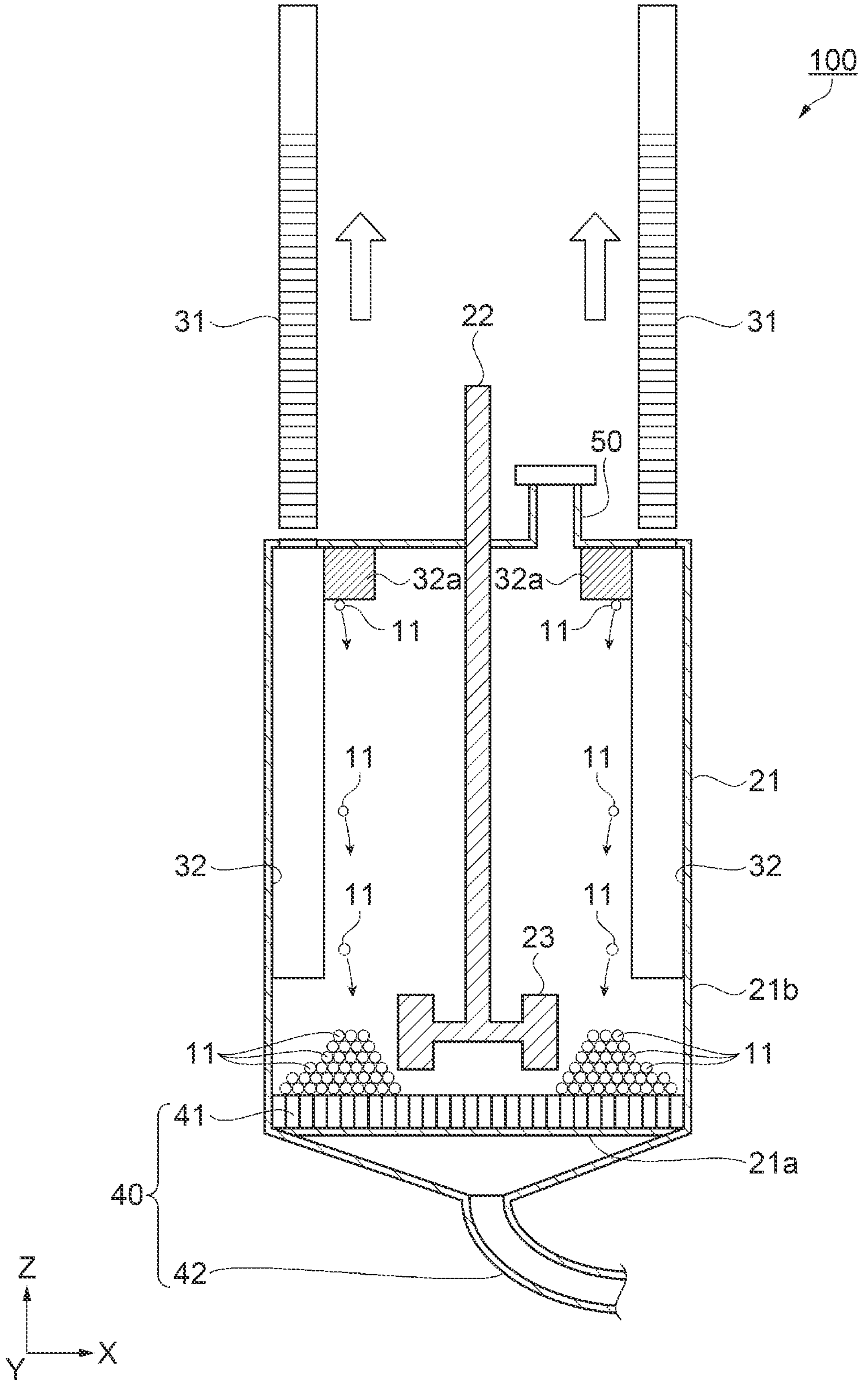
FIG. 7 is a cross-sectional view of the filtration separator illustrating the filtration separation method.

Subsequently, in Step S15, the magnetic force is brought into an off state. Specifically, as shown in FIG. 7, the magnet 31 stored in the storage portion 32 is pulled out upward. By doing this, the magnetic particles 11 adsorbed to the magnet 31 fall on the filter 41 below, and the magnetic particles 11 are placed on the filter 41. Since the separation wall 32*a* is provided adjacent to the storage portion 32 in the upper part of the storage tank 21, the magnetic particles 11 can be prevented from going outside the storage tank 21 together with the magnet 31 when the magnet 31 is pulled out.

Since the liquid 10 is filtered through the filter 41 in a state where the magnetic particles 11 are adsorbed to the magnet 31 and thereafter the magnetic particles 11 are gathered together (formed into a cake) and placed on the filter 41 in this manner, the reaction liquid 12 and the magnetic particles 11 can be reliably separated.

Figure 8:
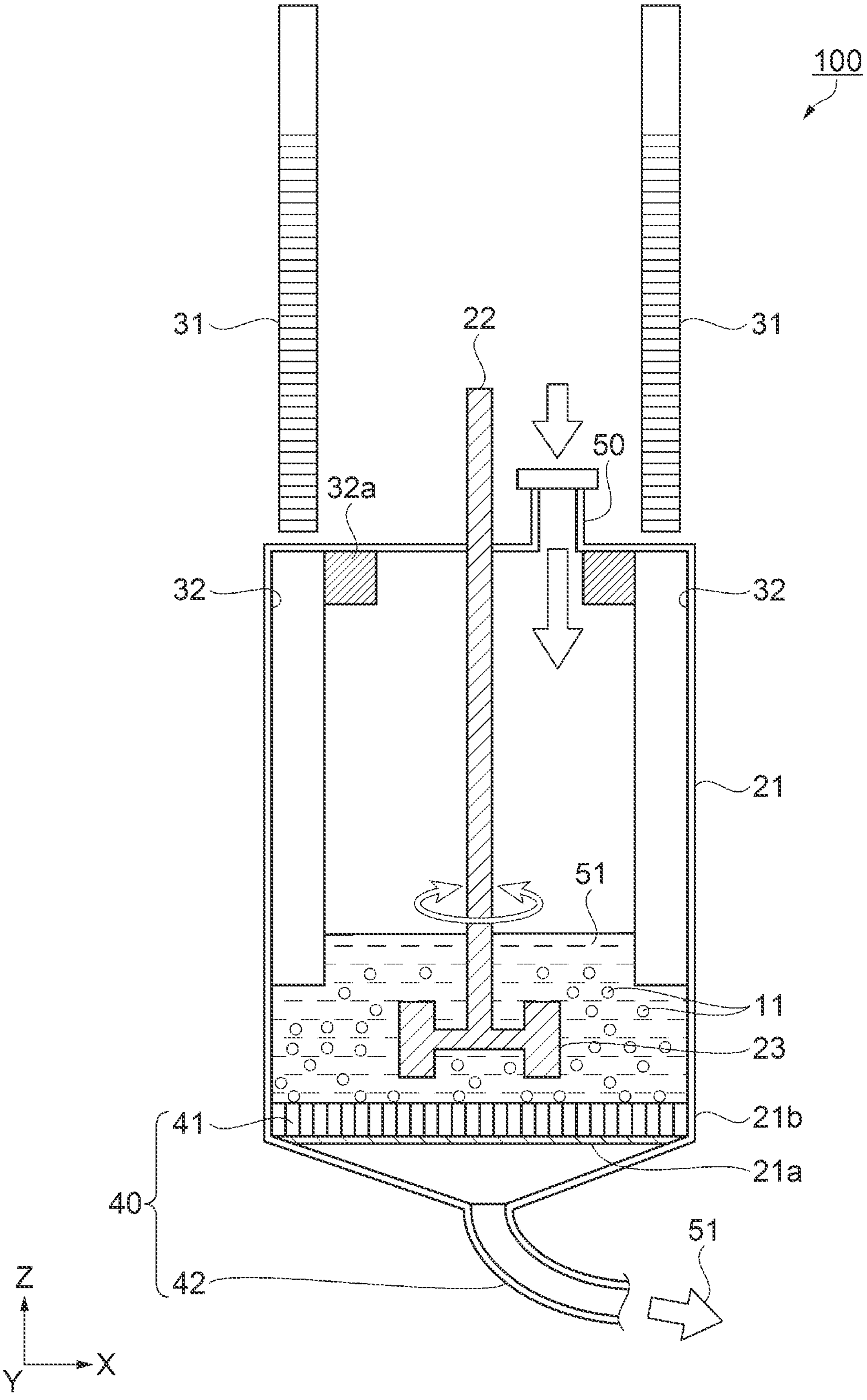
FIG. 8 is a cross-sectional view of the filtration separator illustrating the filtration separation method.

Subsequently, in Step S16, the separated magnetic particles 11 are washed. Specifically, as shown in FIG. 8, the washing liquid 51 is supplied into the storage tank 21 from the washing liquid supply portion 50. The magnetic particles 11 are collected (formed into a cake) on the filter 41, and therefore can be washed by allowing the washing liquid 51 to pass through the magnetic particles 11. As shown in FIG. 8, washing may be performed by stirring the magnetic particles 11 in a small amount of the washing liquid 51. That is, the magnetic particles 11 can be efficiently washed with a small amount of the washing liquid 51.

Subsequently, in Step S17, the washed magnetic particles are dried. As the drying method, for example, drying is performed by allowing air to flow. According to this method, the magnetic particles 11 are dried after being washed, and therefore, for example, the magnetic particles 11 can move on to the subsequent step soon.

Next, the effect of the present embodiment with respect to Comparative Examples will be described with reference to FIG. 9.

A table shown in FIG. 9 shows five steps as the production steps. The coating reaction corresponds to Step S11 and is a step of performing a coating reaction of the surfaces of the magnetic particles 11 with silicon oxide. The collection by magnetic force corresponds to Steps S12 and S13 and is a step of adsorbing the magnetic particles 11 to the magnet 31. The filter filtration corresponds to Step S14 and is a step of filtering the liquid 10 through the filter 41. The filtration cake formation time corresponds to Step S15 and is a step of collecting the magnetic particles 11 on the filter 41. The cake washing corresponds to Step S16 and is a step of washing the magnetic particles 11 on the filter 41.

Further, in the table shown in FIG. 9, three items are determined as the results. The solid-liquid separation time is a time for separating the magnetic particles 11 and the reaction liquid 12 from the liquid 10 by filtering the liquid 10 in the storage tank 21 through the filter 41. As for the washing efficiency, washing efficiency when the reaction liquid 12 adhered to the magnetic particles 11 is washed off is determined. As for the magnetic particle loss, how much the magnetic particles 11 contained in the liquid 10 could be captured by the filter 41, in other words, a loss as to how much the magnetic particles 11 could not be captured is observed.

Comparative Example 1 is an example in which the collection by magnetic force was not performed. Comparative Example 2 is an example in which the filtration with the filter 41 was not performed, and is a case where washing was performed without forming a cake.

As a result, in Comparative Example 1, when the collection by magnetic force is not performed, the cake formation time by filtration is long, and the time for separating the magnetic particles 11 is prolonged, and therefore, the result is determined to be bad. In Comparative Example 2, when the filtration with the filter 41 is not performed, the washing efficiency is low and also the loss of the magnetic particles 11 increases, and the result is determined to be bad.

On the other hand, in the present embodiment, the collection by magnetic force is performed with the magnet 31 and the filtration is performed using the filter 41, and therefore, the solid-liquid separation time in which the magnetic particles 11 precipitate is short, the washing efficiency is high, and the magnetic particle loss is small. Therefore, all the results can be determined to be good.

As described above, the filtration separator 100 for the magnetic particles 11 of the present embodiment includes the storage tank 21 that stores the liquid 10 in which the magnetic particles 11 are dispersed, and that has the bottom portion 21*a* and the side wall portion 21*b*, the stirring mechanism 20 having the rotating shaft portion 22 inserted into the storage tank 21 in a direction crossing a face of the bottom portion 21*a*, and the stirring impeller 23 that is coupled to the rotating shaft portion 22 and that stirs the liquid 10 by rotation of the rotating shaft portion 22, the magnet mechanism 30 that is provided in at least a part of the side wall portion 21*b*, and that can switch a magnetic force in the storage tank 21 between an on state and an off state, and that adsorb the magnetic particles 11 in the liquid 10 to the side wall portion 21*b* when it is in the on state, and the filtration mechanism 40 having the filter 41 provided in the bottom portion 21*a* of the storage tank 21, and the discharge port 42 from which the liquid 10 after passing through the filter 41 is discharged.

According to the configuration, the filtration mechanism 40 is disposed in the bottom portion 21*a* of the storage tank 21, and therefore, when the liquid 10 is discharged through the filter 41 from the storage tank 21 while keeping the magnet mechanism 30 in an on state, the magnetic particles 11 which were not adsorbed to the magnet mechanism 30, in other words, the magnetic particles 11 which are fine and difficult to collect by the magnetic force can be captured by the filter 41. Thereafter, by bringing the magnet mechanism 30 into an off state, the magnetic particles 11 can be gathered together on the filter 41, so that the liquid 10, that is, the reaction liquid 12 and the magnetic particles 11 can be reliably separated. Accordingly, the magnetic particles 11 can be separated efficiently without loss in a short time.

Further, in the filtration separator 100 for the magnetic particles 11 of the present embodiment, it is preferred that the magnet mechanism 30 has the magnet 31, and the on state is a state where the magnet 31 is brought close to the side wall portion 21*b*, and the off state is a state where the magnet 31 is separated from the side wall portion 21*b*. According to this configuration, the switching between the on state and the off state is carried out by the position of the magnet 31, and therefore, by confirming the position of the magnet 31, the state of the magnetic force in the storage tank 21 can be easily ascertained. In addition, the switching between the on state and the off state can be carried out by a simple configuration.

Further, in the filtration separator 100 for the magnetic particles 11 of the present embodiment, it is preferred that the magnet mechanism 30 switches between the on state and the off state by moving the magnet 31 in a direction along the side wall portion 21*b*. According to this configuration, the switching between the on state and the off state is carried out by moving the magnet 31 along the side wall portion 21*b*, and therefore, the magnetic particles 11 can be adsorbed to the side wall portion 21*b* by a simple configuration.

Further, in the filtration separator 100 for the magnetic particles 11 of the present embodiment, it is preferred that the side wall portion 21*b* includes the storage portion 32 that stores the magnet 31 when it is in the on state. According to this configuration, the storage portion 32 is included, and therefore, the height or the position of the magnet 31 can be maintained at a predetermined place. Therefore, the magnetic particles 11 can be adsorbed to the predetermined place.

Further, in the filtration separator 100 for the magnetic particles 11 of the present embodiment, it is preferred that the storage portion 32 includes the separation wall 32*a* that separates the magnet 31 and the magnetic particles 11 collected by the magnet 31. According to this configuration, the separation wall 32*a* is included, and therefore, the magnetic particles 11 can be prevented from going outside the storage tank 21 together when the magnet 31 is moved.

Further, in the filtration separator 100 for the magnetic particles 11 of the present embodiment, it is preferred that in an upper part above the filter 41 in the storage tank 21, the washing liquid supply portion 50 that supplies the washing liquid 51 into the storage tank 21 is provided. According to this configuration, the washing liquid supply portion 50 is provided, and therefore, the magnetic particles 11 placed on the filter 41 in a gathered state (also referred to as a cake state) can be washed with a small amount of the washing liquid 51. Therefore, the magnetic particles 11 can be efficiently washed in a short time.

Further, the filtration separation method for the magnetic particles 11 of the present embodiment includes storing the liquid 10 in which the magnetic particles 11 are dispersed in the storage tank 21 having the bottom portion 21*a* and the side wall portion 21*b*, bringing a magnetic force in the storage tank 21 into an on state from at least a part of the side wall portion 21*b*, adsorbing the magnetic particles 11 to the side wall portion 21*b* by rotating the rotating shaft portion 22 inserted in a direction crossing a face of the bottom portion 21*a* and stirring the liquid 10 with the stirring impeller 23 coupled to the rotating shaft portion 22 in a state where the magnetic force is in the on state, filtering the liquid 10 through the filter 41 by discharging the liquid 10 from the discharge port 42 provided in the bottom portion 21*a* in a state where the magnetic particles 11 are adsorbed to the side wall portion 21*b*, and placing the magnetic particles 11 adsorbed to the side wall portion 21*b* on the filter 41 by bringing the magnetic force in the storage tank 21 into an off state.

According to this method, the liquid 10 is filtered through the filter 41 in a state where the magnetic particles 11 are adsorbed to the side wall portion 21*b*, and therefore, the magnetic particles 11 which were not adsorbed to the side wall portion 21*b*, in other words, the magnetic particles 11 which are fine and difficult to collect by the magnetic force can be captured by the filter 41. Thereafter, by bringing the magnetic force into an off state, the magnetic particles 11 can be gathered together on the filter 41, so that the liquid 10, that is, the reaction liquid 12 and the magnetic particles 11 can be reliably separated. Accordingly, the magnetic particles 11 can be separated efficiently without loss in a short time.

Further, in the filtration separation method for the magnetic particles 11 of the present embodiment, it is preferred to include washing the magnetic particles 11 on the filter 41 by supplying the washing liquid 51 from above the filter 41 after placing the magnetic particles 11 on the filter 41. According to this method, washing is performed after the liquid 10 is filtered, and therefore, washing can be efficiently performed with a small amount of the washing liquid 51.

Further, in the filtration separation method for the magnetic particles 11 of the present embodiment, it is preferred to include drying the washed magnetic particles 11 after washing the magnetic particles 11. According to this method, the magnetic particles 11 are dried after being washed, and therefore, for example, the magnetic particles 11 can move on to the subsequent step soon.

Hereinafter, modifications of the above-mentioned embodiment will be described.

As described above, the magnet 31 is not limited to being a permanent magnet, and for example, an electromagnet may be used. Specifically, the on state and the off state of the magnetic force are operated with an electrical electromagnet.

In this manner, it is preferred that the magnet mechanism 30 of the modification has an electromagnet, and the on state is a state where electricity is applied to the electromagnet, and the off state is a state where electricity is not applied to the electromagnet. According to this configuration, the switching between the on state and the off state can be electrically carried out using an electromagnet, and therefore, it can be dealt with by providing an electrical facility. Further, it is magnetically safe.

Further, after completing the washing of the magnetic particles 11, washing may be performed by adsorbing the magnetic particles 11 again using the magnet 31 and removing the washing liquid 51, and then supplying the washing liquid 51 into the storage tank 21. That is, washing may be repeated multiple times.

Further, when the magnetic particles 11 are washed, it is not limited to dispersing and stirring the magnetic particles 11 in a small amount of the washing liquid 51, and for example, washing may be performed by allowing the washing liquid 51 to pass through from above a cake composed of the magnetic particles 11. According to this, an unnecessary component is concentrated and discharged, and therefore, as compared with a method of diluting the unnecessary component by dispersing the magnetic particles 11 in the washing liquid 51, the magnetic particles 11 can be efficiently washed with a smaller amount of the washing liquid 51.

Further, as the filtration method, a pressurized filtration method or a vacuum filtration method may be adopted according to need. In addition, the washing state of the magnetic particles 11 may be ascertained by monitoring the properties (such as pH) of the filtrate.

Further, the magnet 31 is not limited to one having a circular ring shape with the entire circumference coupled, and for example, may be a magnet in a circular ring shape divided into multiple parts. In addition, the divided magnet may be configured to rotate along the side wall portion 21*b* of the storage tank 21.

Further, the above-mentioned filtration separator 100 or filtration separation method may be applied to the use of detection of a viral gene to be used in a PCR test or the like. In addition, it is also applicable to the extraction and washing of a nucleic acid or a protein.

What is claimed is:

1. A filtration separator for magnetic particles, comprising:

a storage tank that stores a liquid in which the magnetic particles are dispersed, and that has a bottom portion and a side wall portion, wherein the side wall portion is different from the bottom portion;

a stirring mechanism having a rotating shaft portion inserted into the storage tank in a direction crossing a face of the bottom portion, and a stirring impeller that is coupled to the rotating shaft portion and that stirs the liquid by rotation of the rotating shaft portion;

a magnet mechanism that is provided in an entire part of the side wall portion, and that can switch a magnetic force in the storage tank between an on state and an off state, and that adsorbs the magnetic particles in the liquid to the side wall portion when the magnetic force is in the on state, wherein the magnet mechanism includes a magnet that has a circular ring shape, and the magnet is coupled to an entire circumference of the side wall portion; and a filtration mechanism having a filter disposed on the face of the bottom portion of the storage tank, and a discharge port from which the liquid after passing through the filter is discharged.

2. The filtration separator for the magnetic particles according to claim 1, wherein the magnet is an electromagnet, the on state is a state where electricity is applied to the electromagnet, and the off state is a state where the electricity is not applied to the electromagnet.

3. The filtration separator for the magnetic particles according to claim 1, wherein the on state is a state where the magnet is brought close to the side wall portion, and the off state is a state where the magnet is separated from the side wall portion.

4. The filtration separator for the magnetic particles according to claim 3, wherein the magnet mechanism switches the magnetic force between the on state and the off state by moving the magnet in a direction along the side wall portion.

5. The filtration separator for the magnetic particles according to claim 3, wherein the side wall portion includes a storage portion that stores the magnet when the magnetic force is in the on state.

6. The filtration separator for the magnetic particles according to claim 5, wherein the storage portion includes a separation wall that separates the magnet and the magnetic particles collected by the magnet.

7. The filtration separator for the magnetic particles according to claim 1, wherein in an upper part above the filter in the storage tank, a washing liquid supply portion that supplies a washing liquid into the storage tank is provided.

* * * * *